United States Patent [19]

Tagawa

[11] Patent Number: 5,214,522

[45] Date of Patent: May 25, 1993

[54] LIQUID CRYSTAL DISPLAY WITH BACK LIGHT AND CONDUCTIVE DIFFUSER

[75] Inventor: Koichi Tagawa, Kanagawa, Japan

[73] Assignee: Sony Corporation, Tokyo, Japan

[21] Appl. No.: 728,277

[22] Filed: Jul. 11, 1991

[30] Foreign Application Priority Data

Jul. 25, 1990 [JP] Japan .............................. 2-196802

[51] Int. Cl.⁵ .................. G02F 1/1333; G02F 1/1335
[52] U.S. Cl. ........................................ 359/49; 359/69;
359/50; 359/83; 359/87; 362/223; 362/311;
362/362
[58] Field of Search ...................... 359/48-50,
359/69, 83, 87, 88; 362/31, 222, 223, 260, 311,
355, 362, 368, 370, 367

[56] References Cited

U.S. PATENT DOCUMENTS

| | | | |
|---|---|---|---|
| 4,138,195 | 2/1979 | Saurer et al. | 359/87 |
| 4,206,501 | 6/1980 | Brooks | 359/69 |
| 4,602,850 | 7/1986 | DeBenedetti | 359/87 |
| 4,744,638 | 5/1988 | Ota et al. | 359/49 |
| 4,748,546 | 5/1988 | Ukrainsky | 359/50 |
| 4,945,350 | 7/1990 | Kawamura | 359/50 |
| 5,029,984 | 7/1991 | Adachi et al. | 359/48 |

FOREIGN PATENT DOCUMENTS

| | | | |
|---|---|---|---|
| 0019208 | 11/1980 | European Pat. Off. | 359/69 |
| 0168757 | 1/1986 | European Pat. Off. | 359/50 |
| 0094738 | 5/1984 | Japan | 359/69 |
| 0105253 | 6/1984 | Japan | 359/50 |
| 0002132 | 1/1986 | Japan | 359/63 |
| 0089821 | 4/1988 | Japan | 359/50 |
| 0293524 | 11/1988 | Japan | 359/49 |
| 0313136 | 12/1988 | Japan | 359/48 |
| 0013923 | 1/1990 | Japan | 359/48 |
| 0109020 | 4/1990 | Japan | 359/50 |

Primary Examiner—William L. Sikes
Assistant Examiner—Tai V. Duong
Attorney, Agent, or Firm—Lewis H. Eslinger; Jay H. Maioli

[57] ABSTRACT

A liquid crystal display with a back light is provided, in which a diffuser (diffusing plate) mounted on a front surface of a casing in which the back light is housed is rendered conductive to thereby reduce the leakage of electromagnetic waves.

5 Claims, 2 Drawing Sheets

LIQUID CRYSTAL DISPLAY WITH BACK LIGHT AND CONDUCTIVE DIFFUSER

BACKGROUND OF THE INVENTION

1. Field of the Invention

The present invention generally relates to liquid crystal display devices and, more particularly, is directed to a liquid crystal display with back light.

2. Description of the Prior Art

A variety of liquid crystal displays (hereinafter simply referred to as LCDs) have been proposed so far and a twisted nematic display mode (TN mode) liquid crystal is known as one of the most popular LCDs.

As shown in a schematic diagram forming FIG. 1, this type of LCD is comprised of X-axis and Y-axis transparent electrodes 6, 8 formed on the inner surface of a pair of glass substrates 5, 9 in the direction perpendicular to each other in a matrix fashion, a TN liquid crystal 7 sandwiched between the two electrodes 6 and 8 with a twisted orientation of 90 degrees and a pair of polarizing plates 4, 10 unitarily formed with the outer surfaces of the glass substrates 5, 9 in the direction perpendicular to each other. In this case, the pair of polarizing plates 4, 10 are bonded to the outer surfaces of the glass substrates 5, 9. A voltage is applied between the transparent electrodes 6, 8 of a liquid crystal panel 13 formed by the above-mentioned elements by means of a driving source 11 and a switching device 12. When this TN mode liquid crystal is in its off state, that is, without application of voltage, a linearly-polarized light is rotated 90 degrees and passed by the liquid crystal panel 13. When on the other hand this TN mode liquid crystal is applied with voltage and turned on, then the twisted state is removed and the linearly-polarized light is inhibited from passing the liquid crystal panel 13.

When the LCD is constructed by using such liquid crystal panel 13, the LCD is generally formed as a reflection type, a reflection type using a back light or a transparent type. The kinds of back light 2 are selected in accordance with the purpose that for which the LCD is to be used. The back light might be an incandescent lamp, a fluorescent lamp, an electroluminescent lamp (EL) and so on. The fluorescent lamp is a light source suitable for color LCD and widely used because the fluorescent lamp produces light having a plurality of peaks of brightness in the visible region and this light becomes substantially white light. The fluorescent lamp is generally formed as a hot cathode type or a cold cathode type. The hot cathode type of fluorescent lamp is driven by a voltage of from 200 to 300 Volts and the cold cathode type of fluorescent lamp is driven by a high voltage of nearly 4000 Volts. The back light 2 formed of, for example, the fluorescent lamp is housed in a casing 1 having a diffuser 3 on the front surface thereof. This casing 1 is generally made of metal and the diffuser 3 is made of a white plastic plate or the like. The casing 1 has the liquid crystal panel 13 unitarily assembled into the front portion of the diffuser 3 as shown in FIG. 2.

When the back light 2 of the LCD is driven, a voltage of 200 to 300 Volts is applied to the cathode of the hot cathode type fluorescent lamp and a high voltage of about 4000 Volts is applied to the cathode of the cold cathode type fluorescent lamp. Further, a driving source is not a commercially available voltage source but a high frequency of about 40 kHz is employed as a switching means to thereby increase light emission efficiency.

Let us now consider that such LCD is installed, for example, on the rear surface of each of the passenger seats in the cabin of an airplane so that the passengers can enjoy watching video programs of different channels. In that case, the airplane has very strict specification on the leaked electromagnetic noise so as to prevent the automatic pilot system of the airplane from being affected thereby. Particularly, since the electromagnetic noise from the fluorescent lamp 2 is emitted from the LCD panel surface through the diffuser 3 and the liquid crystal panel 13, it is necessary to provide a countermeasure to prevent the electromagnetic noise, i.e., electromagnetic waves, from being leaked. As one of the methods for preventing electromagnetic waves from being leaked, it is proposed that, as shown in FIG. 2, a conductive film 14 such as an ITO film or the like is bonded to or coated on the front surface of the liquid crystal panel 13 to thereby shield the electromagnetic noise from the back light 2. In this arrangement, however, in order to visually confirm whether the light is passed through or cut off by the liquid crystal panel 13, the conductive film 14 must be made transparent, which unavoidably decreases the light utilizing ratio of the liquid crystal panel 13.

OBJECTS AND SUMMARY OF THE INVENTION

Accordingly, it is an object of the present invention to provide an improved liquid crystal display with a back light in which the aforementioned shortcomings and disadvantages of the prior art can be eliminated.

More specifically, it is an object of the present invention to provide a liquid crystal display with a back light in which electromagnetic noise from the back light is completely shielded by rendering a diffuser (diffusing plate) conductive, thereby making it possible to utilize a conductive material which is not transparent.

As an aspect of the present invention, a liquid crystal display with a back light is provided, in which a diffuser (diffusing plate) mounted on a front surface of a casing in which the back light is housed is rendered conductive to thereby reduce the leakage of electromagnetic waves.

The above and other objects, features, and advantages of the present invention will become apparent in the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

Figure 1:
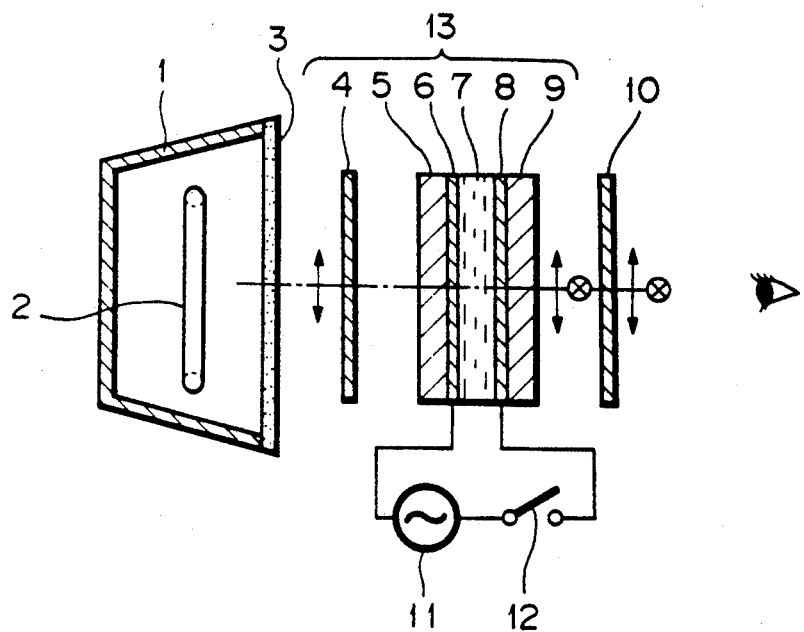
FIG. 1 is a schematic diagram showing a conventional liquid crystal display.
Figure 2:
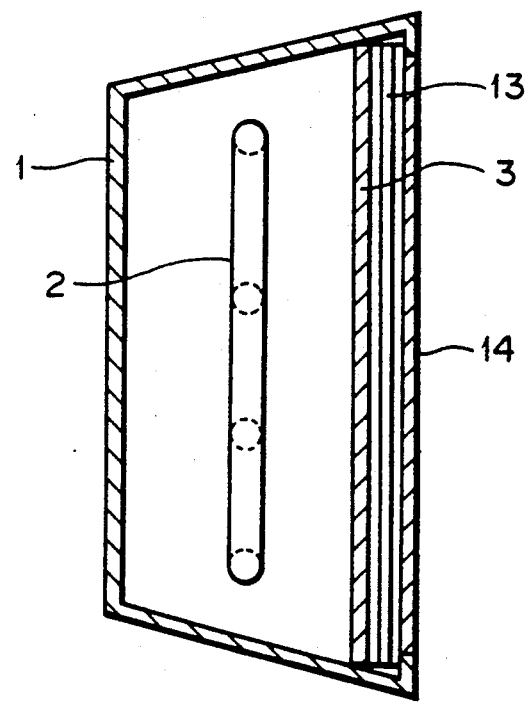
FIG. 2 is a cross-sectional side view of the conventional liquid crystal display with a back light.
Figure 3A:
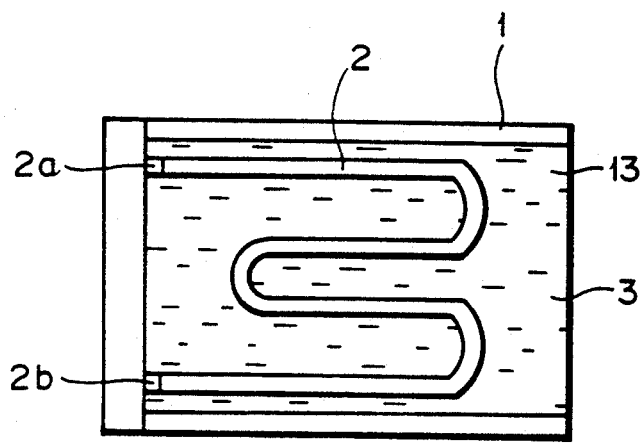
FIGS. 3A and 3B are front view and cross-sectional side view illustrating a liquid crystal display with a back light according to an embodiment of the present invention.
Figure 3B:
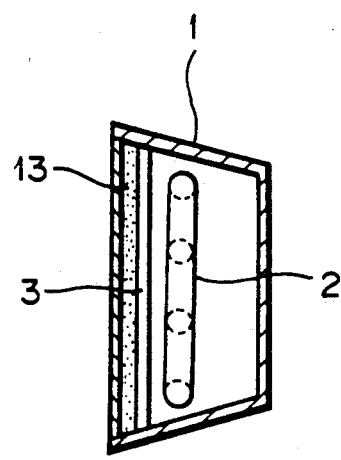
Figure 4:
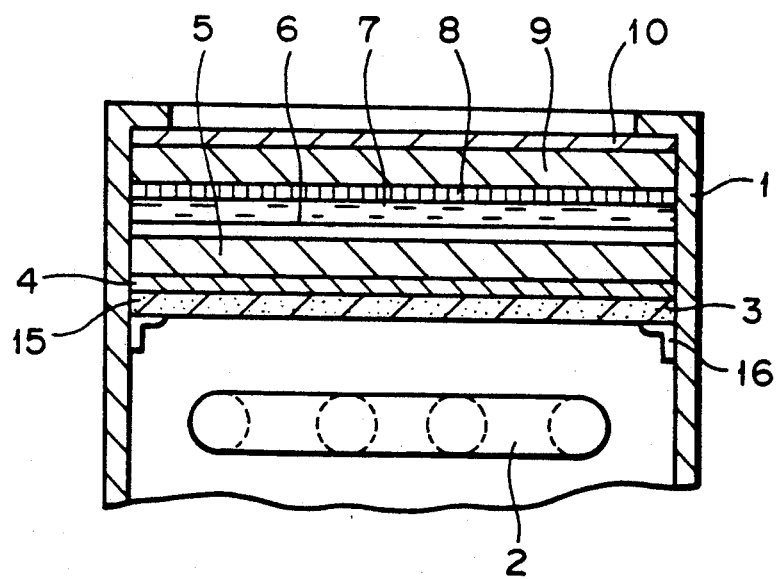
FIG. 4 is a cross-sectional side view of a main portion of the liquid crystal display with a back light of the present invention.

The arrangement of the liquid crystal display with a back light according to the present invention will now be described with reference to FIGS. 3A, 3B and FIG. 4. In FIGS. 3A, 3B and FIG. 4, like parts corresponding to those of FIGS. 1 and 2 are marked with the same references and therefore need not be described in detail.

As shown in FIGS. 3A, 3B, the casing 1 is made of a metal material and shaped substantially as a box whose front surface is opened. The diffuser 3 is rectangular and made of white plastic or the like. This diffuser 3 is mounted on the front surface of the casing 1 and the back light 2 formed of a fluorescent lamp having an M-letter configuration is disposed within a space defined by the casing 1 and the diffuser 3. The back light 2 has two electrodes 2a, 2b connected, for example, to a switching power supply source of high frequency, e.g., 40 kHz (not shown) and, a voltage of 200 to 300 Volts is supplied to the cathode of the back light 2 if the back light 2 is formed of the hot cathode type fluorescent lamp.

If the diffuser 3 is made of white plastic, then a conductive member 15 may be produced by bonding a transparent conductive film (manufactured by TEIJIN LTD.) to the front or rear surface of the diffuser 3. Alternatively, this conductive member 15 may be provided by mixing a predetermined amount of conductive material, such as very small particle powder of carbon or the like into the diffuser 3 during the manufacturing-process of the diffuser 3 or the transparent or conductive member 15 may be produced by vapor-depositing a certain kind of metal thin film, such as gold, titanium or the like onto the diffuser 3.

If the diffuser 3 is formed of a glass substrate whose surface is formed as a frosted glass by the etching-process so as to improve its light diffusion effect, then a NESA film or ITO film available on the market can be deposited onto the diffuser 3. The NESA film is a transparent conductive glass formed by depositing a stannic oxide ($SnO_2$) film on the glass substrate, and the ITO film is produced by vapor-depositing an indium oxide ($In_2C_2$) film on the glass substrate.

The diffuser 3 having the conductive member 15 is rendered conductive to the metal casing 1 sufficiently via a brush 16 or metal fitting of L-letter configuration, etc., as shown in FIG. 4. Then, the liquid crystal panel 13 similar to that of FIG. 1 is mounted on the front surface of the diffuser 3 and the diffuser 3 is unitarily secured to the casing 1. As shown in FIG. 4, the liquid crystal panel 13 is composed of a pair of polarizing plates 4, 10 and a TN type liquid crystal 7 sandwiched between the transparent electrodes 6 and 8 provided on the pair of glass substrates 5, 9. Of course, the liquid crystal 7 is not limited to a STN (super twisted nematic) liquid crystal, a DSTN (double STN) liquid crystal or the like and might be an active matrix type LCD and so on.

Since the liquid crystal display with back light of this embodiment is arranged as described above, the electromagnetic noise from the back light 2 can be shielded even though the high voltage of the back light 2 is switched at high frequency, the electromagnetic noise from the back light 2 can be shielded. Also, effect of the diffusing plate for diffusing light from the back light 2 and effect of the electromagnetic shielding plate can be achieved at the same time.

It is clear that the shape of the back light 2 is not limited to the M-letter configuration and may be modified variously.

According to the liquid crystal display with back light of the present invention, since the electromagnetic noise from the back light can be shielded and this liquid crystal display can be unitarily formed with the diffusing plate, the diffuser is not necessarily made of the transparent conductive material, which renders the diffuser conductive with ease.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A liquid crystal display with a back light for illuminating said liquid crystal display characterized by rendering electrically conductive a diffuser attached to a rear surface of said liquid crystal display which is mounted on a front surface opening of an electrically conductive casing for housing said back light, wherein said diffuser is rendered conductive by mixing a predetermined amount of conductive material into said diffuser in the manufacturing process of said diffuser, and further comprising an electrically conductive fitting means mounted on an inner surface of said electrically conductive casing and being in contact with said diffuser for making electrical continuity between said diffuser and said casing.

2. A liquid crystal display with a back light according to claim 1, wherein said conductive material is very small particle powder of carbon.

3. A liquid crystal display with a back light for illuminating said liquid crystal display characterized by rendering electrically conductive a diffuser attached to a rear surface of said liquid crystal display which is mounted on a front surface opening of an electrically conductive casing housing said back light, wherein said diffuser is rendered conductive by vapor depositing a conductive metal thin film to a rear surface of said diffuser and further comprising an electrically conductive fitting means mounted on an inner surface of said casing and being in electrical contact with said conductive film on said diffuser for making electrical continuity between said diffuser and said casing.

4. A liquid crystal display with a back light according to claim 3, wherein said metal thin film is made of gold.

5. A liquid crystal display with a back light according to claim 3, wherein said metal thin film is made of titanium.

* * * * *